United States Patent [19]

Francel et al.

[11] 3,954,486

[45] May 4, 1976

[54] SOLDER GLASS WITH REFRACTORY FILLER

[75] Inventors: Josef Francel, Toledo; Robert F. Palermo, Waterville, both of Ohio

[73] Assignee: Owens-Illinois, Inc., Toledo, Ohio

[22] Filed: July 30, 1974

[21] Appl. No.: 493,091

[52] U.S. Cl. .................................. 106/53; 106/54
[51] Int. Cl.² ........................................ C03C 3/04
[58] Field of Search ...................... 106/47 R, 53, 54

[56] References Cited
UNITED STATES PATENTS

| | | | |
|---|---|---|---|
| 2,863,782 | 12/1958 | Eubank | 106/47 R |
| 3,250,631 | 5/1966 | Lusher | 106/39.6 X |
| 3,258,350 | 6/1966 | Martin | 106/47 R |
| 3,275,358 | 9/1966 | Shonebarger | 106/47 R |
| 3,425,817 | 2/1969 | Ikeda | 106/47 R |
| 3,454,408 | 2/1969 | Busdiecker | 106/47 R |
| 3,778,242 | 12/1973 | Francel | 106/39.6 X |

*Primary Examiner*—Winston A. Douglas
*Assistant Examiner*—John F. Niebling
*Attorney, Agent, or Firm*—Howard G. Bruss, Jr.; E. J. Holler

[57] ABSTRACT

Disclosed is a physical blend of particulate lead borate sealing glass and particulate refractory filler for use in forming thermal fusion seals for workpieces having a lower coefficient of thermal expansion than the sealing glass. The particulate refractory filler has a particle size diameter in excess of about 37 microns (i.e. plus 400 U.S. Sieve) to lower the expansion while maintaining adequate flow during fusion. The blend is especially useful as a package sealant for electronic components.

9 Claims, No Drawings

SOLDER GLASS WITH REFRACTORY FILLER

This invention relates to sealing glass compositions and method of using same. More particularly, this invention pertains to the use of particulate, low expansion refractory fillers such as silica, lithium aluminosilicates including β-spodumene, petalite, and low expansion lithium aluminosilicate glass-ceramics; alumina; aluminosilicates; zirconia; titania; tin oxide; and zircon to reduce the thermal expansion of lead borate sealing glass while maintaining adequate flow for efficient sealing.

It has long been known that sealing or solder glasses are advantageous means for sealing together pieces of material such as glass, ceramic, metal or the like. Many solder glasses of both the crystallizable and vitreous types have been developed which have the ability to soften and flow at temperatures significantly below the deformation temperature of the components which they bond so as to cause a minimum of damage during the heat-sealing operation. Unfortunately, these solder glasses often have coefficients of expansion which are much higher than those of the components which they bond together. Thus, upon cooling after heat-sealing is completed, mechanical stresses develop in the seal which further weaken them. In order to overcome some of the problems occurring with vitreous solder glasses, the art has developed several solder glasses which are initially vitreous but which crystallize in-situ during heat-sealing. Such in-situ crystallization tends to strengthen the seal structure and lower the coefficient of expansion of the seal, thus bringing it more nearly into accordance with the components which then bond together.

In many instances, and regardless of whether vitreous of crystallized (i.e. devitrified) solder glass seals are employed, the components which they bond together are often used to encapsulate, or are otherwise connected with, delicate heat-sensitive parts such as electronic equipment, microelectronic circuitry, black and white or color television bulbs, and the like. To such components any increase in temperature experienced in their environment is detrimental and undesirable. The commercial acceptability of any solder glass is determined not only by its strength of bond, ability to hermetically seal, reproducibility and the like, but also upon its ability to flow during fusion, be heat-sealed at a minimum temperature within a minimum period of time and thermally contract at a rate compatible with the workpiece being sealed.

In the past it has been suggested to employ low expansion filler materials to reduce thermal expansion of solder glasses (to produce compatibility with ceramics having lower expansion than that of the solder glass) without the extreme increases of viscosity (and reductions of flow) characteristic of solder glasses containing significant proportions of filler material. It was generally believed that very finely divided refractory fillers were most effective in achieving these properties as it was theorized that the fine particles would more readily fuse into the seal during the fusion step to aid in lowering the contraction without detracting from flow. Consequently, the particle size specification on the refractory filler, when expressed at all, was usually expressed in terms of "fineness" rather than "coarseness", which shows a lack of appreciation of the principles of the present invention. For instance, it was common to describe the particles as being "−270 mesh."

Prior method of employing filler materials in solder glasses consisting of making additions of fine particles in the amount needed to provide a bulk thermal expansion coefficient compatible with the system to be sealed (e.g. alumina). This resulted in extreme restrictions of flow which often resulted in seals having marginal hermeticity and which prevented achievement of compressive stresses in the seal sufficient to impart adequate thermal shock resistance and mechanical strength.

This invention improves on these techniques by providing addition of filler materials of specified particle size in sufficient proportions to achieve compatible thermal expansion at relatively low sealing temperatures without sacrificing flow, thereby forming a seal of superior hermeticity, superior thermal shock resistance, and superior mechanical strength.

Commonly assigned U.S. Pat. No. 3,250,631 discloses the addition of refractory oxide powders such as silica or β-eucryptite to solder glasses to lower the thermal expansion. Particle size of the filler is not specifically discussed as being critical. Example 2 of this patent uses a commercially available "flour" of β-eucryptite and Example 3 discloses the use of crushed fused quartz having a particle size of −270 mesh. No lower size limit for the particle size is discussed.

U.S. Pat. No. 3,258,350 discloses the use of powdered zircon of an unspecified particle size as a refractory filler for solder glass.

Commonly assigned U.S. Pat. No. 3,778,242 discloses a solder glass which contains uncrystallized but crystallizable solder glass modified with inert refractory material and a precrystallized solder glass. Particle size is discussed in that all of the constituents of this solder glass should be less than about 100 U.S. Sieve Series screen in size. Preferrably, about 50% by weight of all particles should be less than about 325 U.S. Sieve Series screen in size but less than 5% by weight smaller than 5 microns. Example 1 of this patent uses a filler having a particle size such that over 70% thereof passes 400 mesh. While this description gives some recognition to the particle sizes criteria for solder glasses and fillers therefor, it does not disclose or suggest the dramatic improvement in the flow characteristics during fusion, while materially lowering the thermal contraction after cooling that are achieved by the present invention.

Also of interest is the article entitled, "Solder Glass Seals in Semiconductor Packaging" by D. W. A. Forbes appearing in Glass Technology, Vol. 8, No. 2 (1967) which provides general background information on solder glasses of this type. Pages 35 and 36 of this article discuss solder glasses containing refractory materials such as silica, zirconia, quartz, and β-eucryptite, although particle size and concentration of these fillers are not particularly discussed. Also of general interest are U.S. Pat. Nos. 3,228,548; 2,863,782; 3,061,664; and 2,969,293 which disclose the use of refractory oxides in solder glasses and enamels.

The present invention represents a marked improvement of these techniques by providing a blend of particulate lead borate solder glass and particulate low expansion refractory filler [(e.g. refractory fillers having a coefficient of thermal expansion of less than 65 and usually less than about $40 \times 10^{-7}/°C(0°-300°C)$)] for use in thermal fusion sealing to a workpiece having a lower coefficient of expansion than the solder glass, wherein essentially all of the refractory filler has a particle size diameter in excess of about 400 mesh U.S.

Sieve Series screen (i.e. greater than about 37 micron in diameter). Preferably the refractory filler has a particle size diameter in excess of 37 microns (i.e. 400 mesh) and less than 150 microns (i.e. about 100 mesh) as determined by U.S. Sieve Series screen analysis. The upper limit on a particle size is a function of the method of application of the sealant blend. Most commercial methods of application involve the extrusion or silk screen printing of a paste of the sealant blend and plugging the application device could be a problem when the refractory filler has a particle size substantially in excess of about 100 mesh.

The lead-borate (inclusive of lead-zinc-borate) solder glass employed can be any well-known conventional solder glass in the art as disclosed in U.S. Pat. No. 3,778,242. The particle size of the lead-borate solder glass is not particularly critical to the practice of the present invention and any conventional particle size distribution such as shown in U.S. Pat. No. 3,778,242 can be employed. It is the particle size of the filler and not the solder glass that forms the basis of the present invention. Such lead-borate solder glasses usually have coefficients of thermal contraction of about 80 to 110 × $10^{-7}$/°C over the temperature range from the sealing temperature to room temperature. Such glasses are used in forming vitreous seals as well as glass-ceramic or semicrystalline seals as is known in the art and weight % compositional ranges are set forth below where the total content of all oxides is 100%.

| Oxide | Broad Range | Usual Range |
|---|---|---|
| PbO | 70–85 | 75–85 |
| ZnO | 0–20 | 2–16 |
| $B_2O_3$ | 5–15 | 8–15 |
| $SiO_2$ | 0–10 | 0–5 |
| BaO | 0–3 | 0–2 |
| $SnO_2$ | 0–5 | 0–2 |

Other conventional glassmaking oxides such as CaO, CuO, $Bi_2O_3$, $Na_2O$, $K_2O$, $Li_2O$, CdO, and $Fe_2O_3$ can be included. However, it is preferred in many instances not to employ these ingredients but rather to provide compositions which consist essentially only of those ingredients set forth above.

The particulate refractory filler useful in this invention can be any of such well-known materials, synthetic or natural, conventional to the art. These refractory fillers include silica; lithium aluminosilicates including β-spodumene, petalite, β-eucryptite and low expansion lithium aluminosilicate glass-ceramics, as in U.S. Pat. No. 3,788,865, (with or without colorants), alumina; aluminosilicates including mullite clays and other clays; zirconia; tin oxide; and zircon. Of these lithium aluminosilicates, aluminosilicate clays and zircon are preferred for efficiency and economy. For best results, the refractory filler employed should be capable, of decreasing the expansion coefficient of the solder glass at least about 1–25 × $10^{-7}$/°C over the temperature when used in a proportion of up to about 25% by weight of the blend.

The techniques for obtaining the particulate refractory filler in the size range of interest is conventional in the art and forms no part of the present invention. Suffice it to say that conventional crushing and grinding operations as well as conventional screening and classifying techniques such as disclosed in Chemical Engineer's Handbook edited by John H. Perry, McGraw Hill, Third Edition (1950) can be employed.

The specific weight percents actually employed of particulate solder glass and refractory filler will vary over a wide range depending upon the ultimate application. Generally speaking, a sufficient amount of refractory oxide should be added such that together they provide the necessary coefficient of expansion match-up, flow properties, and crystallization speed to decrease the normal time-temperature factor of the heat-sealing process while at the same time provide a strong, tightly hermetic, moisture-resistant seal. This is usually in the range of 1 to 25% by weight of the solder glass/refractory filler blend with about 5 to about 20% being suitable for most applications.

The seal is formed by thermally fusing a layer of the blend of particulate solder glass and particulate refractory filler while in intimate contact with the workpiece at a temperature and for a time sufficient to flow and fuse such blend into a strong, hermetic seal having a coefficient of thermal contraction less than the solder glass initially present in the blend. Temperatures in the range of 350°–500°C for time periods ranging from about 1 minute to about 1 hour are typical for crystallizing and noncrystallizing solder glasses with the lower temperatures usually requiring the longer time periods. In the usual practice, strong, hermetically tight, reproducible seals are formed in about 5 minutes to about 30 minutes at temperatures in the range of 350° to 450°C.

The resulting seal formed from the blends of invention can be vitreous or devitrified (i.e. crystalline) seals depending upon the solder glass composition, and time and temperature of fusion. The lead-borate glasses containing zinc have a greater tendency to crystallized during fusion sealing to form devitrified seals. The lead-borate solder glasses containing little or no zinc have a greater tendency to remain vitreous during fusion sealing.

The blends of particulate solder glass and particulate refractory filler of this invention can be applied to the workpieces to be sealed by any conventional technique as in U.S. Pat. No. 3,778,242. Examples of such techniques include spraying, screen-printing, and pyrolyzable tapes. In forming the blends into sprayable slurries, they are usually dispersed in a liquid organic vehicle such as alcohol to a sprayable viscosity. Another example of a slurry vehicle is 1½ percent nitrocellulose in amyl acetate. Any of the conventional paste organic vehicles can be employed for forming a paste while conventional tapes can also be used.

Once the blend is applied, it is dried and/or heated in accordance with conventional techniques to burn off the vehicle and then fired to fuse the seal, with or without crystallization or devitrification. A particularly preferred heat cycle for fusing a faceplate to television funnel seal according to this invention comprises a heat up rate of about 10°C/minute, a hold as indicated at the sealing temperature, and a cool down rate of about 5°C/minute. Such a heat cycle usually insures a high quality seal without causing detrimental thermal stress in workpieces. For small electronic package sealing and glazing a heat up and cool down rate of about 80°C/minute and higher can be used without causing thermal shock of the workpiece. Set forth below are characteristics of good fusion sealing glasses in terms of the amount of flow and coefficient of thermal contraction necessary for achieving strong, hermetic seals for various workpieces of commercial significance in the electronics field.

The "flow" is measured by placing a compacted pellet of the blend of sealing glass and particulate refractory filler on the surface of the workpiece to be sealed, (or a standard glass workpiece of a known coefficient of contraction close to the workpiece of interest) and then heating to form the fusion seal. The width and the height of the pellet after heating is measured and the ratio of the width/height is expressed as flow. This ratio is a figure of "merit" and expresses several important characteristics such as viscosity, wetting, crystallization, and boundary effects in a single empirical number. The higher flow values are usually desired to assure adequate coverage of the joint to be sealed.

The test pellet is formed by compacting the blend of particulate sealing glass and refractory filler into a cylinder having a 3mm height and a 3mm diameter in a ram press compaction die.

The coefficient of thermal contraction is measured from the sealing temperature to room temperature because this is the meaningful temperature range wherein stresses are developed in forming seals in commercial applications.

Set forth below are the characteristics of a good fusion sealing glass in terms of the amount of flow and coefficient of thermal contraction necessary for achieving strong, hermetic seals for various workpieces of commercial significance. These criteria have been expressly established for each application by making numerous observations. When the flow and contraction requirement are met, a good seal results in the indicated application. For the purpose of comparison the workpiece used in the Examples is a flat piece of soda-lime glass having a coefficient of contraction of $80 \times 10^{-7}/°C$. The flow and coefficient of thermal contraction for the formed seal are easily determined from this standard glass workpiece.

| Workpiece | Approximate coefficient of thermal expansion $\times 10^7/°C(0-300°C)$ | Minimum Flow (W/H) | Maximum Coefficient of thermal contraction $\times 10^7$ |
|---|---|---|---|
| Color television bulbs | 98 | 2.3 | 98 |
| Black and white television bulb | 91 | 1.0 | 90 |
| Alumina to kovar metal alloy | 71 64 | 1.3 | 78 |
| Alumina to alumina | 71 | 1.0 | 78 |
| Alumina to black and white television bulbs | 71 91 | 1.0 | 86 |

The following examples illustrate the present invention in specific comparative terms. In these examples all parts are parts by weight, all percentages are weight percentages and all temperatures are in °C unless otherwise indicated. All screen sizes are U.S. Sieve Series wherein a 400 mesh screen has a 37 micron opening, a 325 mesh has a 44 micron opening, and a 200 mesh has a 74 micron opening. The coefficients of thermal contraction are from the sealing temperature to room temperature.

EXAMPLE 1

Part A

A solder glass having the following composition in weight %:

| PbO | 75% |
|---|---|
| $B_2O_3$ | 8.4 |
| ZnO | 12.6 |
| $SiO_2$ | 2.0 |
| BaO | 2.0 | is formed by melting conventional batch materials in a platinum crucible at about 1000°C in an air atmosphere for about 2 hours. The glass is then fritted over water-cooled rolls and ground to a particle size such that 70% by weight of the particles are less than about 400 mesh.

Part B

A particulate glass-ceramic refractory filler having the composition:

| $SiO_2$ | 67.5 |
|---|---|
| $Al_2O_3$ | 21.0 |
| $Li_2O$ | 4.0 |
| CaO | 2.7 |
| $ZrO_2$ | 2.0 |
| $TiO_2$ | 1.8 |
| ZnO | 1.0 | is prepared from conventional batch ingredients as in Example 42 of U.S. Pat. No. 3,788,865 (but without the colorants) by melting in a platinum crucible at 1600°C for 72 hours to form a homogeneous glass in a gas fired glass melting furnace. The homogeneous glass is then cooled to room temperature and heat treated at about 730°C for 16 hours followed by 1 hour at 800°C to form a semicrystalline glass-ceramic body. The glass-ceramic body is then crushed and comminuted using a rotary ball mill loaded with alumina balls and screened into a +400 mesh fraction (i.e. greater than 37 micron particle size diameter). The coefficient of thermal expansion of these glass-ceramic particles is $0 \times 10^{-7}/°C$ (0°–300°C).

Part C

A series of physical blends (Set 1) of the +400 mesh fraction of the particulate glass-ceramic refractory filler from Part B and the particulate sealing glass from Part A are prepared by intimate mixing in a conventional double cone rotary blender.

A similar series (Set 2) of physical blends of the particulate sealing glass of Part A and the −400 mesh fraction of the particulate glass-ceramic refractory filler from Part B is prepared. The suitability of these blends is then tested for sealing an electronic component including alumina to kovar metal seals by compacting a test pellet and measuring the flow and thermal contraction coefficient for the seals produced by the procedure described above. The seal is formed on the standard soda-lime glass piece described above by placing the pellet on the workpiece and fusing the seal at 480°C for 12 minutes in an electrically heated furnace using a heat up and cool down rate of approximately 80°C/minute. Kovar metal has a coefficient of thermal contraction of about $64 \times 10^{-7}/°C$ over the range from sealing temperature to room temperature and alumina has a coefficient of about $71 \times 10^{-7}/°C$ over the same temperature range. The results of these tests are set forth below.

| % Refractory Filler in Blend | Set 1 (Invention) Flow | Coefficient of thermal contraction × $10^7$ |
|---|---|---|
| 0 | 3.8 | 96 |
| 5 | 3.52 | 80 |
| 10 | 2.44 | 76 |
| 15 | 1.38 | 71 |

| % Refractory Filler in Blend | Set 2 (Control) Flow | Coefficient of thermal contraction × $10^7$ |
|---|---|---|
| 0 | 3.8 | 96 |
| 5 | 2.75 | 84 |
| 10 | 1.51 | 79 |
| 15 | 0.95 | 76 |

The above data shows that some of the blends of Set 1 fulfill the requirements of kovar-alumina seals (i.e. flow > 1.3 and coefficient of thermal contraction <78) and none of the blends from Set 2 fulfills the requirements. Furthermore, it is observed that for a given filler content Set 1 has higher flow and lower contraction than the corresponding blend of Set 2.

Part D

To further demonstrate the principles of the present invention, a vitreous seal is formed between kovar metal and alumina in an electronic component comprising a conventional dual in-line package (i.e. DIP). A solder glass plate is prepared by mixing 85 parts by weight of the fourth blend of a Set 1 with 15 parts of a nitrocellulose-amyl acetate binder which comprises 98% amyl acetate and 2% nitrocellulose. Several flat alumina workpieces (1/4 inch wide × 3/4 inch long) having a shallow (1/8 inch wide × 1/4 inch long) cavity on one side thereof, are obtained. The paste is then silk screen printed on the side of the several alumina workpieces having the cavity (but not in the cavity) to a wet thickness of approximately 12 mils and heated to 400°C for 5 minutes to form a vitreous glaze on the workpieces. One glazed alumina workpiece is heated to approximately 520°C to soften the glaze. A kovar lead frame, generally in the shape of a grid, is set on the softened glaze and the grids are allowed to sink into the softened glaze and become embedded therein over a period of about 2 minutes. The workpiece is then cooled.

This lead frame-workpiece assembly is inverted and the kovar grid placed on another alumina workpiece which has been similarly glazed. This assembly is heated at approximately 80°C per minute heating rate to 450°C and held for 15 minutes to form a fusion seal between the alumina and the kovar grid, and then cooled to room temperature. The resulting DIP resembles a sandwich where the alumina is the "bread" and the kovar grid is the "meat". The cavities in each piece of alumina face the kovar grid and are hermetically sealed.

The resulting DIP electronic package is subjected to thermal cycling tests between −65°C and +200°C according to Military Standard 883, Method 1010, Condition D. Hermeticity of the package is measured before and after the thermal cycling by means of fluorocarbon gross leak tests and helium leak detection in accordance with Military Standard 883, Method 1014, Condition A (Helium), Conditon C (gross leak Step 1). One hundred of such DIP are tested and none exceeded the test specification helium leak rate of $1 \times 10^{-8}$cc/sec.

The mechanical strength of the DIP is tested by subjecting the DIP to a torque test whereby one of the alumina parts of the package is sheared away from the package in torsion. Several packages are tested and torque stress in excess of 50 inch pounds is required to cause mechanical failure.

EXAMPLE 2

The procedures of Part C of Example 1 are repeated except that +400 mesh and −400 mesh fractions of particulte zircon ($ZrSiO_4$) are used as the refractory filler in place of the particulate glass-ceramic filler. The zircon particles have a coefficient of thermal expansion of $33 \times 10^{-7}/°C$ (0°–300°C). The results are set forth below:

| % Refractory Filler in Blend | Set 1 (Invention) Flow | Coefficient of thermal contraction × $10^7$ |
|---|---|---|
| 5 | 3.3 | 87 |
| 10 | 2.84 | 81 |
| 15 | 2.40 | 76 |

Similar results are obtained in sealing a DIP when the procedures of Part C of Example 1 are repeated using the third blend of Set 1 of Example 2 in the sealant paste.

| % Refractory Filler in Blend | Set 2 (Control) Flow | Coefficient of thermal contraction × $10^7$ |
|---|---|---|
| 5 | 1.87 | 89 |
| 10 | 1.06 | 85 |
| 15 | 0.87 | 83 |

The dramatic affect of the relatively coarse particle size of Set 1 in decreasing the coefficient of thermal contraction while maintaining adequate flow for fusion sealing is readily apparent.

EXAMPLE 3

Part A

The particulate solder glass of Part A of Example 1 is blended in a series of various proportions (Set 1) with particulate glass-ceramic filler of the composition of Part B of Example 1 which has been ground and screened into a fraction which is −325 mesh and +400 mesh (i.e. particles having a diameter in the range of 37 to 44 microns).

A similar series (Set 2) of physical blends of particulate sealing glass and particulate glass-ceramic filler having a random distribution of particles in the 1 to 50 micron diameter range is also prepared for the purpose of comparison.

A fusion seal is formed by the procedures of Part C of Example 1 by fusing at 450°C for 15 minutes with a heat up rate and cool down rate at approximately 80°C per minute. The results of the tests are set forth below.

Set 1 (Invention)

| % Refractory Filler in Blend | Flow | Coefficient of thermal contraction × 10⁷ |
|---|---|---|
| 5 | 2.82 | 85 |
| 10 | 1.86 | 79 |
| 15 | 1.62 | 76 |
| 25 | 1.45 | 71 |

Set 2 (Control)

| % Refractory Filler in Blend | Flow | Coefficient of thermal contraction × 10⁷ |
|---|---|---|
| 5 | 2.75 | 86 |
| 10 | 1.72 | 81 |
| 15 | 1.17 | 76 |
| 25 | 0.96 | 70 |

The above data indicates that some of the seals of Set 1 fulfill the requirements for sealing alumina to kovar. Seals can be formed at a fusion temperature of 450°C using a filler having a particle size diameter in the 37 to 44 micron range. Set 2, having the random particle sizes in the 1 to 50 particle range, does not readily fulfill these requirements.

EXAMPLE 4

Part A

A particulate solder glass having the following compositions in weight percent:

| | |
|---|---|
| PbO | 84.1 |
| B₂O₃ | 12.3 |
| ZnO | 2.7 |
| SiO₂ | 0.4 |
| BaO | 0.5 | is prepared by the procedures of Part A of Example 1. The particulate solder glass is blended with a particulate glass-ceramic filler having the composition of Part B of Example 1, but which has been ground and screened into a −325 mesh +400 mesh fraction. The particle size diameter is then in the 37 micron to 44 micron range. A series of fusion seals is formed by firing a series of blends of the solder glass and glass-ceramic filler (Set 1) at 400°C for 30 minutes by the procedure of Example 1. The results are set forth below.

A similar series (Set 2) of blends is prepared using zircon having a particle size fraction of −325 mesh +400 mesh as a filler in place of the glass-ceramic filler.

Set 1 (glass-ceramic filler)

| % Refractory Filler in Blend | Flow | Coefficient of thermal contraction × 10⁷ |
|---|---|---|
| 0 | 3.48 | 106 |
| 5 | 3.14 | 101 |
| 6 | 3.00 | 97 |
| 7.5 | 2.88 | 94 |

Set 2 (zircon filler)

| % Refractory Filler in Blend | Flow | Coefficient of thermal contraction × 10⁷ |
|---|---|---|
| 0 | 3.48 | 106 |
| 5 | 3.20 | 104 |

Set 1 (glass-ceramic filler)

| % Refractory Filler in Blend | Flow | Coefficient of thermal contraction × 10⁷ |
|---|---|---|
| 10 | 3.00 | 102 |
| 15 | 2.94 | 100 |
| 20 | 2.84 | 96 |

The above data indicates that the glass-ceramic filler and the zircon filler are both effective in fulfilling the requirements for forming color television bulb seals. Six percent of the glass-ceramic and 20% of the zircon appears to be quite satisfactory for this purpose.

To further demonstrate this principle, a funnel to faceplate seal in a color television bulb can be formed as follows. A solder glass paste is formed by mixing the third blend of Set 1 of Example 3 (i.e. a blend containing 6% glass-ceramic filler) with an organic binder which comprises 98.8 parts of amyl acetate and 1.2 parts of nitrocellulose. The resulting paste contains 92% by weight of the blend and 8% by weight of the organic binder. The paste has a "toothpaste like" consistency.

The solder glass paste is extruded as a bead on the sealing surface of the television glass funnel to be sealed. The bead of solder glass is dried without fusing the solder glass particles. The faceplate is placed on the bead of solder glass paste in sealing relationship with the funnel and the assembly is heated at the rate of 10°C per minute to 400°C held for 30 minutes at this temperature, and then cooled to room temperature at the rate of 5°C per minute.

A tight hermetic crystalline glass seal is formed between the faceplate and the funnel.

To test the seal, the bulb is heated to 400°C and evacuated as during service in television applications and the seals remain intact and hermetic under these conditions. An unsatisfactory seal would leak or implode.

Part B

The procedures of Part A of this example are repeated except that the particulate refractory filler is ground and screened to −200 mesh +325 mesh (i.e. a particle size in the range of 44 to 74 microns). The results are set forth below. Set 1 represents the series of blends using the particulate glass-ceramic filler and Set 2 is the series of blends using the particulate zircon refractory filler.

Set 1

| % Refractory Filler in Blend | Flow | Coefficient of thermal contraction × 10⁷ |
|---|---|---|
| 0 | 3.5 | 106 |
| 5 | 3.1 | 100 |
| 6 | 3.0 | 97 |
| 7.5 | 2.9 | 93 |
| 10 | 2.5 | 83 |
| 15 | 1.5 | 78 |
| 20 | 1.3 | 74 |

Set 2

| % Refractory Filler in Blend | Flow | Coefficient of thermal contraction × 10⁷ |
|---|---|---|
| 0 | 3.5 | 106 |
| 5 | 3.3 | 102 |
| 10 | 3.1 | 100 |
| 15 | 3.0 | 98 |
| 17 | 3.0 | 96 |

| % Refractory Filler in Blend | Set 1 Flow | Coefficient of thermal contraction × 10⁷ |
|---|---|---|
| 20 | 2.9 | 94 |

The above data indicates the relationship between the proportion of filler, and the flow of contraction for forming alumina-kovar metal seals at 400°C. In Set 1, 15% of the glass-ceramic filler will meet specifications. Set 2 shows the effectiveness of zircon in lowering the expansion while providing good flow.

EXAMPLE 5

The procedures of Example 4 are repeated except that the fusion temperature is 390°C and the workpiece sealed is the glass for color television bulbs. The results are set forth below for each series of blends using glass-ceramic fillers and zircon fillers.

| Refractory Filler in Blend | Set 1 (glass-ceramic filler) Flow | Coefficient of thermal contraction × 10 |
|---|---|---|
| 0 | 3.1 | 106 |
| 5 | 2.9 | 100 |
| 6 | 2.8 | 96 |

| % Refractory Filler in Blend | Set 2 (zircon filler) Flow | Coefficient of thermal contraction × 10⁷ |
|---|---|---|
| 0 | 3.1 | 106 |
| 5 | 2.9 | 104 |
| 10 | 2.5 | 102 |
| 15 | 2.4 | 100 |
| 20 | 2.3 | 97 |

This data indicates that a 6% proportion of particulate glass-ceramic filler and a proportion of 20% particulate zircon filler having a particle size coarser than 37 microns provide the flow and contraction specifications required for sealing color television faceplates and funnels.

Part B

The procedures for Set 1 of Part A are repeated except that the firing temperature is 380°C. The results are set forth below.

| % Refractory Filler in Blend | Set 1 (glass-ceramic filler) Flow | Coefficient of thermal contraction × 10 |
|---|---|---|
| 0 | 2.1 | 108 |
| 5 | 1.9 | 101 |
| 6 | 1.7 | 97 |
| 10 | 1.5 | 86 |

This data indicates that the specifications for seals for black and white television bulbs, and black and white television bulbs with alumina are readily attained by the present invention.

EXAMPLE 6

To further demonstrate the principles of the present invention, a lead borate solder glass comprising 85% by weight PbO and 15% by weight $B_2O_3$ is prepared and comminuted by the procedures of Part A of Example 1.

Aluminosilicate clay of the mullite type having the composition $3\ Al_2O_3 \cdot 2\ SiO_2$ is screened into a +400 U.S. Sieve fraction and a −400 U.S. Sieve fraction.

A series of blends are then prepared using the above described lead borate sealing glass with the above +400 mesh aluminosilicate clay. Other blends of the lead borate solder glass and glass-ceramic fillers of Part B of Example 1 as well as zircon and β-eucryptite are also prepared.

The blends are prepared, fused at 450°C for 15 minutes and evaluated by the method of Example 1. The results are set forth below. For the purpose of control a set of blends is prepared using the smaller particle size (i.e. −400 mesh) clay to illustrate the dramatic improvements achieved by the practice of the present invention.

| % Refractory Filler in Blend | Type of Refractory Filler | Set 1 Invention Particle Size Diameter | Flow | Coefficient of Thermal Contraction × 10⁷ |
|---|---|---|---|---|
| 0 | | | 5.581 | 123 |
| 20 | mullite clay | >37 μ | 2.651 | 87 |
| 20 | zircon | >37μ | 5.073 | 89 |
| 20 | glass-ceramic | >37μ | 1.374 | 75 |
| 20 | Beta eucryptite >37μ | 3.359 | 76 | |

| % Refractory Filler in Blend | Type of Refractory Filler | Set 2 Control Particle Size Diameter | Flow | Coefficient of Thermal Contraction × 10⁷ |
|---|---|---|---|---|
| 15 | mullite clay | <37μ | 4.682 | 95 |
| 20 | mullite clay | <37μ | 1.206 | 91 |
| 25 | mullite clay | <37μ | 1.153 | 87 |
| 30 | mullite clay | <37μ | 1.000 | 81 |

The foregoing data indicates that the performance specifications for many sealing applications are fulfilled with the blends of Set 1, while the blends of Set 2 are less desirable for many of these applications.

Other solder glass compositions which have been found to be particularly suitable for blending with particulate refractory filler having a particle size in excess of 37 microns in the practice of the present invention including:

| Oxide | Weight % | Weight % |
|---|---|---|
| PbO | 75.5 | 71.0 |
| $B_2O_3$ | 8.5 | 10.0 |
| ZnO | 12.0 | 15.8 |
| $SiO_2$ | 2.0 | 2.2 |

| Oxide | -continued Weight % | Weight % |
|---|---|---|
| BaO | 2.0 | 1.0 |

For convenience in disclosure, the disclosures of the patents and publications mentioned above are incorporated herein by reference.

Having thus described the invention, what is claimed is:

1. In a physical blend of particulate lead-borate solder glass and particulate low expansion refractory filler said filler having a coefficient of thermal expansion of less than about $65 \times 10^{-7}$/°C (0–300°C), for use in thermal fusion sealing to a workpiece having a lower coefficient of thermal expansion than said solder glass, the improvement wherein said refractory filler has a particle size diameter in excess of about 37 microns and not substantially in excess of 150 microns whereby the flow is increased and the coefficient of thermal contraction is decreased upon fusion sealing when compared to the flow and thermal contraction properties of a blend of the same composition which has a refractory filler particle size substantially less than 37 microns in diameter.

2. The blend of claim 1 wherein said refractory filler is a lithium aluminosilicate, aluminosilicate, or zircon.

3. The blend of claim 1 wherein said particulate refractory filler is present in the proportion of about 1 to 25% by weight of said blend.

4. The blend of claim 1 wherein said particulate refractory filler is present in the proportion of about 5 to 20% by weight of said blend.

5. The blend of claim 1 wherein said solder glass has the composition consisting essentially of:

| Oxide | % by Weight |
|---|---|
| PbO | 70–85 |
| ZnO | 0–20 |
| $B_2O_3$ | 5–15 |
| $SiO_2$ | 0–10 |
| BaO | 0–3 |
| $SnO_2$ | 0–5 |

6. The blend of claim 1 wherein said solder glass has the composition consisting essentially of:

| Oxide | % by Weight |
|---|---|
| PbO | 75–85 |
| ZnO | 2–16 |
| $B_2O_3$ | 8–15 |
| $SiO_2$ | 0–15 |
| BaO | 0–2 |
| SnO | 0–2 |

7. The method of forming a fusion seal on a workpiece comprising applying the blend of the solder glass and particulate refractory filler of claim 1 to said workpiece and thermally fusing said blend at temperature in the range of 350° to 500°C and for a time period in the range of about 1 minute to about 1 hour to flow and fuse said blend into a strong, hermetic seal having a coefficient of thermal contraction less than the solder glass initially present in said blend.

8. The method of claim 7 wherein said temperature is in the range of about 350° to 450°C and said time is in the range of about 5 minutes to about 30 minutes.

9. The method for forming a fusion seal on a workpiece comprising applying the blend of the solder glass and particulate refractory filler of claim 2 to said workpiece and thermally fusing said blend at temperature in the range of 350° to 500°C and for a time period in the range of about 1 minute to about 1 hour to flow and fuse said blend into a strong, hermetic seal having a coefficient of thermal contraction less than the solder glass initially present in said blend.

* * * * *